(12) United States Patent  
Spaulding et al.

(10) Patent No.: US 6,585,287 B1
(45) Date of Patent: Jul. 1, 2003

(54) ROOF RAIL AIR BAG ASSEMBLY AND METHOD OF INSTALLATION

(75) Inventors: James R. Spaulding, Macomb, MI (US); Olimpia Maria Hernandez, Birmingham, MI (US); Bruce R Koch, Goodrich, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/037,831

(22) Filed: Jan. 3, 2002

(51) Int. Cl.[7] .............................................. B60R 21/16
(52) U.S. Cl. ................. 280/728.2; 280/730.2; 24/458
(58) Field of Search ............... 280/730.2, 730.1, 280/728.1, 728.2; 296/214; 24/457, 458

(56) References Cited

U.S. PATENT DOCUMENTS

| | | | | |
|---|---|---|---|---|
| 4,605,978 A | * | 8/1986 | Zeavin ........................ 360/241 |
| 4,696,128 A | * | 9/1987 | Fukuhara ................... 49/492.1 |
| 4,710,852 A | * | 12/1987 | Keen .......................... 361/717 |
| 5,458,367 A | | 10/1995 | Marts et al. ............. 280/730.1 |
| 5,791,683 A | * | 8/1998 | Shibata et al. ........... 280/730.2 |
| 5,803,486 A | | 9/1998 | Spencer et al. .......... 280/728.2 |
| 5,988,735 A | | 11/1999 | Muller ....................... 296/214 |
| 6,022,044 A | * | 2/2000 | Cherry ..................... 280/730.2 |
| 6,082,761 A | | 7/2000 | Kato et al. ............... 280/730.2 |
| 6,142,506 A | * | 11/2000 | Patel et al. .............. 280/728.2 |
| 6,254,123 B1 | * | 7/2001 | Urushi et al. ............ 280/730.2 |
| 6,296,269 B1 | * | 10/2001 | Nagai et al. ............. 280/728.2 |
| 6,371,512 B1 | * | 4/2002 | Asano et al. ............ 280/730.2 |
| 6,502,855 B1 | * | 1/2003 | Greiner et al. .......... 280/730.2 |

* cited by examiner

*Primary Examiner*—Paul N. Dickson  
*Assistant Examiner*—Faye M. Fleming  
(74) *Attorney, Agent, or Firm*—Laura C. Hargitt

(57) ABSTRACT

A roof rail air bag assembly includes an air bag module having an air bag and an air bag inflator, and a hanger designed to attach the assembly to the roof rail of a vehicle. The installation of the roof rail air bag assembly is accomplished by an operator standing outside the vehicle, and without the use of external fasteners. A roof panel is attached to the vehicle roof rail to permanently fasten the hanger to the vehicle, while the air bag module can be easily removed for servicing.

11 Claims, 3 Drawing Sheets

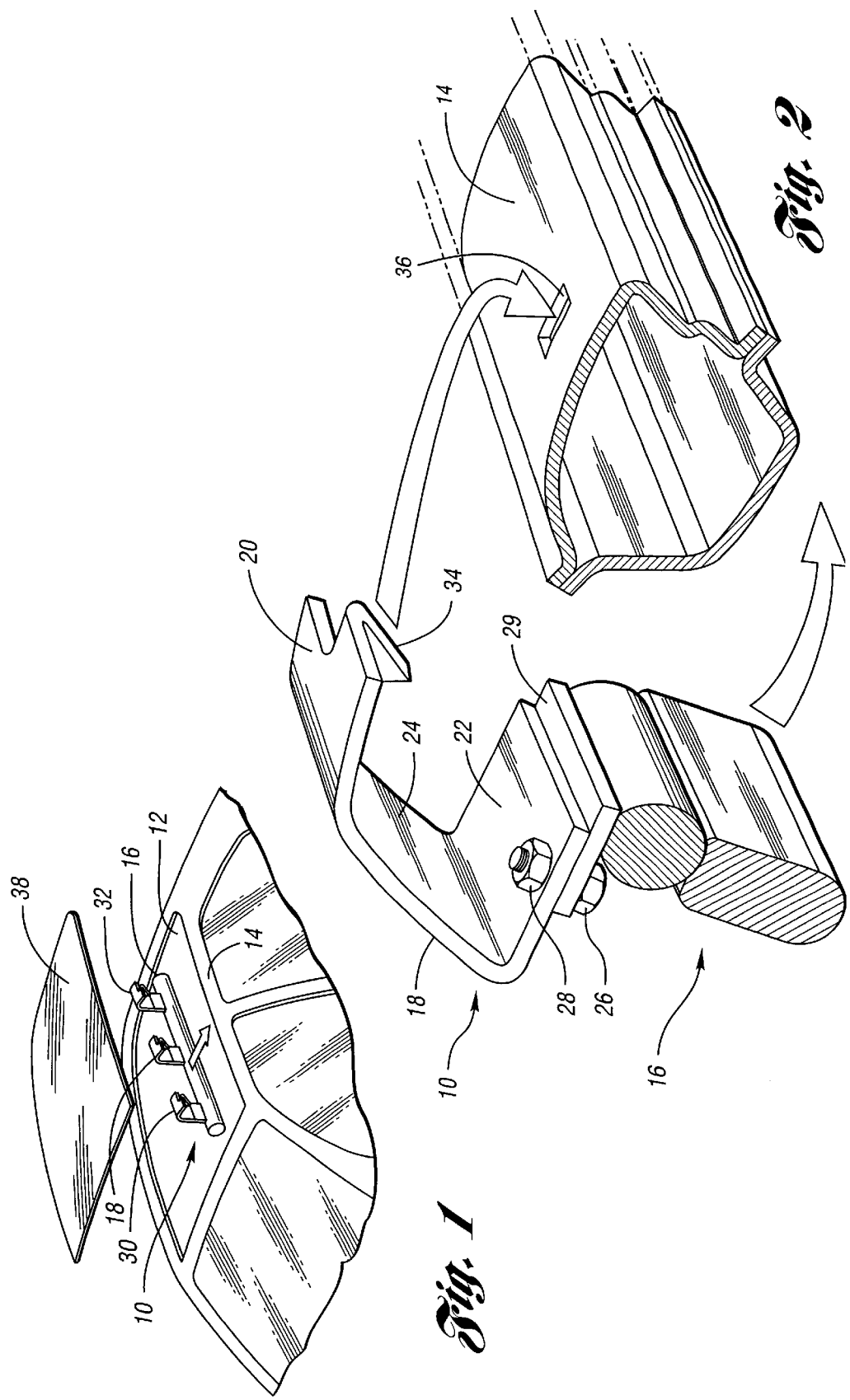

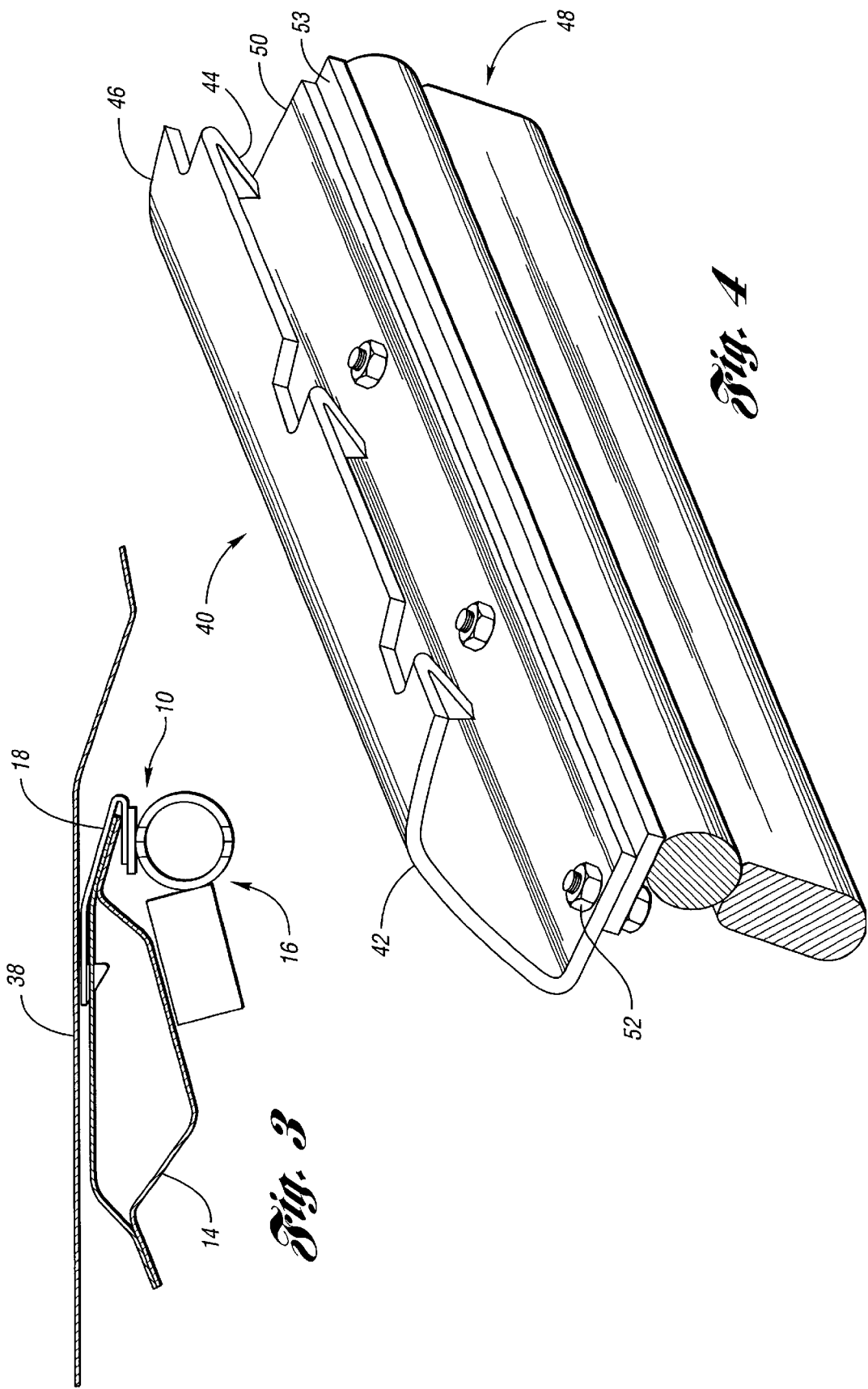

ROOF RAIL AIR BAG ASSEMBLY AND METHOD OF INSTALLATION

BACKGROUND OF THE INVENTION

1. Field of the Invention

The present invention relates to a roof rail air bag assembly for a vehicle and a method of attaching same.

2. Background Art

Use of roof rail air bag assemblies, used primarily as a means to protect vehicle passengers, is well known. Likewise, methods of attaching these air bag assemblies are also well known. Despite their widespread use, typical attachment mechanisms have inherent limitations.

One limitation is the necessity of having separate fasteners to attach the air bag assembly to the vehicle. U.S. Pat. No. 6,082,761 (Kato et al.), issued Jul. 4, 2000, discloses an air bag assembly containing a bracket with mounting holes. Separate fasteners, either threaded or push-in, are inserted through the mounting holes and then secured to the vehicle. This type of design increases the cost of the air bag assembly by requiring additional parts—i.e., fasteners—as well as the additional labor required to install the fasteners and mount the assembly to the vehicle from the side or overhead. Alternative fastener designs include the attachment of weld nuts or "u-nuts" to the roof rail to provide for the air bag installation. Each of these designs however, incurs the additional cost of separate fasteners.

One attempt to overcome this limitation is disclosed in U.S. Pat. No. 5,988,735 (Muller), issued Nov. 23, 1999. Muller discloses a vehicle head liner into which air bag assemblies are mounted. This eliminates the need to separately mount the air bag assemblies onto the vehicle. With this design, the air bags are installed into the vehicle when the head liner is installed, thus eliminating the need to use separate fasteners. A disadvantage of this design is that the installation of the head liner is made more difficult because of the presence of the air bag assemblies. Moreover, this design, as well as other prior art designs, all have another inherent limitation: overhead installation. Each of these designs requires operators to work with air bag assemblies over their heads, which increases overall cycle time.

Accordingly, it is desirable to provide an air bag assembly which overcomes the above referenced short comings of prior art air bag assemblies, by eliminating the need for external fasteners as well as the need for the operator to enter the vehicle or work overhead.

SUMMARY OF THE INVENTION

The present invention provides an air bag assembly that can be attached to the roof rail of a vehicle without the use of external fasteners and while the operator is standing outside the vehicle. This device has applications to all vehicles designed with a modular roof system. The modular roof system is one in which the roof of the vehicle remains open during much of the vehicle's assembly, and then at a later stage, a roof panel is attached covering the opening. This allows the air bag assembly to be hung from the roof rail with the operator standing outside the vehicle and reaching through the vehicle roof opening. After the roof panel is installed, the hanger is trapped between the roof panel and the roof rail, thereby permanently attaching the hanger to the vehicle.

In a preferred embodiment, an air bag module containing an air bag and an inflator is mounted to a hanger to create a roof rail air bag assembly. The hanger is approximately "C" shaped, with a top and bottom portion which are approximately horizontal, connected by a side portion that is angled to accommodate the roof rail. The bottom portion includes a hole to receive a threaded fastener, and the top portion includes a tab, designed to cooperate with an opening in the roof rail.

The hanger is attached to the air bag module with the threaded fastener and a mating nut. Depending on the length of the air bag module, more than one hanger may be used. The air bag module and the hanger, now secured to each other, create a complete roof rail air bag assembly. This is received by the installing operator as a complete unit.

With the preferred embodiment, the roof rail of the vehicle will have a slot, approximately rectangular in shape, pre-formed in its top. It is then a simple matter for the operator, standing outside the vehicle, to place the complete roof rail air bag assembly through the roof opening and pull it back towards the roof rail. The tab on the hanger slides into the slot in the roof rail, while the air bag module slides into position under the roof rail.

In an alternative embodiment, the hanger is designed to accommodate the larger air bag modules associated with sport utility vehicles and the like. A single hanger is made wide enough to include a plurality of tabs. In this way, the top portion of the hanger contacts much more of the roof rail, thereby providing additional support. Moreover, the bottom portion is wide enough to provide multiple points of attachment for the air bag module.

In another embodiment, the hanger does not have a tab, but rather a push-in fastener, such as a "rosebud clip". This design necessitates a change in the roof rail as well, such that the approximately rectangular slot is now replaced with a hole. Attachment of the hanger to the air bag module is the same as in the preferred embodiment, and again the operator receives the complete roof rail air bag assembly as one unit. With this embodiment, the operator again places the assembly into the vehicle through the opening in the roof, and pulls it toward the roof rail. Then, as the air bag module slides into location below the roof rail, the push-in fastener slides toward the hole in the top of the roof rail. Once the push-in fastener is aligned with the hole, the operator can push it into place.

Each of these embodiments are installed by an operator standing outside the vehicle, with no need for the operator to work in an overhead position. Moreover, no loose fasteners are used by the operator, since the roof rail air bag assembly is received as a complete unit. Finally, at a later stage of vehicle assembly, a roof panel will be secured to the top of the roof rails, thereby permanently trapping, thus attaching the hanger to the vehicle. Should the air bag module ever need service, it merely involves removing the threaded fastener and the nut from the hanger. This allows the air bag module to be removed, while the hanger itself remains trapped between the roof panel and the roof rail, and therefore remains permanently secured to the vehicle.

Accordingly, it is an object of the present invention to provide an air bag assembly that can be installed in a vehicle roof rail without the need for the installing operator to work overhead or use separate fasteners.

It is a further object of the present invention to provide an air bag assembly that can be installed in a vehicle roof rail by an operator standing outside the vehicle, whereby the assembly has a hanger, initially attached to the roof rail by the operator, then permanently attached when a roof panel is installed.

A more specific object of one aspect of the invention is a roof rail air bag assembly for a vehicle which has a roof panel and a roof rail. The assembly comprises an air bag module, having at least an air bag and an air bag inflator. A hanger is attached to the air bag module and has a top portion and a bottom portion connected to each other by a side portion, wherein each of the portions has an inner surface and an outer surface. An attachment device is located adjacent to the inner surface of the top portion of the hanger, and is capable of cooperating with the roof rail and the roof panel for attaching the air bag assembly to the vehicle.

A more specific object of another aspect of the invention is a method of installing a roof rail air bag module on a vehicle having a roof rail with an opening and a roof panel, without entering the vehicle and/or working overhead, which comprises providing the module with a hanger portion having an attachment device which is attachable to the roof rail from outside the vehicle, and trapping the hanger portion between the roof rail and the roof panel by attaching the roof panel to the roof rail from outside the vehicle.

A more specific object of yet another aspect of the invention is a vehicle having a roof opening which comprises a roof rail having a top portion and a bottom portion at least partially defining the roof opening, wherein the roof rail has an opening in the top portion. The vehicle has a roof rail air bag assembly comprising at least a roof rail air bag module and at least one hanger, wherein the hanger has an attachment portion, a roof panel configured to cover the roof opening and securable to the roof rail, and wherein the air bag module is located under the bottom portion of the roof rail, the hanger attachment portion is securable inside the roof rail opening, and the roof panel is secured to the roof rail, thereby trapping the attachment portion of the hanger between the roof panel and the roof rail.

The above objects and other objects, features, and advantages of the present invention are readily apparent from the following detailed description of the best modes for carrying out the invention when taken in connection with the accompanying drawings.

BRIEF DESCRIPTION OF THE DRAWINGS

FIG. 1 is a fragmentary perspective view of a vehicle, expanded to show a vehicle roof rail and a roof rail air bag assembly in accordance with the present invention;

FIG. 2 is a fragmentary perspective view of the roof rail air bag assembly shown in FIG. 1, expanded to demonstrate the hanger installation of the roof rail air bag assembly into a vehicle roof rail;

FIG. 3 is a sectional view looking from the rear of the vehicle forward, of the roof rail air bag assembly secured between the roof rail and the vehicle roof; and FIG. 4 is a fragmentary perspective view of a roof rail air bag assembly in accordance with an alternate embodiment of the invention.

DETAILED DESCRIPTION OF THE PREFERRED EMBODIMENT

Figure 5:
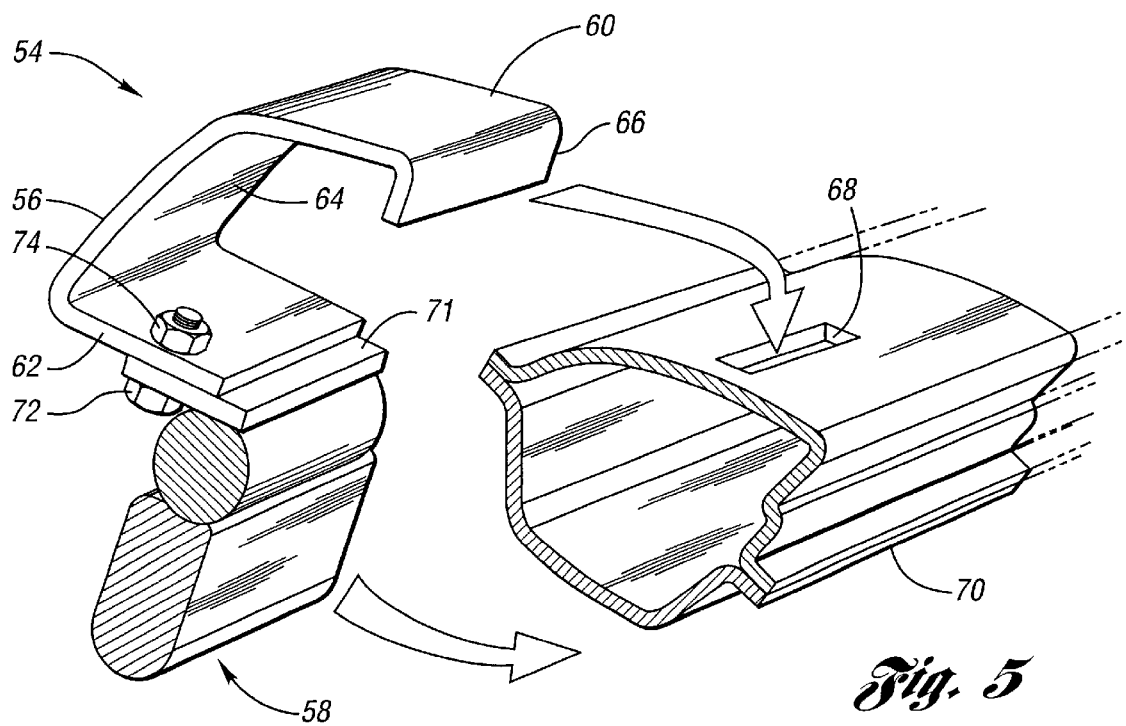
FIG. 5 is a fragmentary perspective expanded view of a vehicle roof rail and a roof rail air bag assembly in accordance with a third embodiment of the invention.

FIG. 1 shows a perspective view of a roof rail air bag assembly 10 in accordance with the present invention. The roof rail air bag assembly 10 is placed through vehicle roof opening 12, for installation on vehicle roof rail 14. This procedure can be seen in greater detail in FIG. 2.

In FIG. 2, it is seen that roof rail air bag assembly 10 is made up of air bag module 16 and hanger 18. The air bag module 16 is shown without detail, but it is noted that the module would typically comprise an air bag cushion, an igniter unit, an inflator, and a plurality of tethers and attachment tabs. Hanger 18 is made up of top portion 20, bottom portion 22, and side portion 24. In a preferred embodiment, the hanger 18 is generally C-shaped to fit about the roof rail 14. Integral with the top portion 20 is a tab 34 which extends from and generally normal to the inner surface of the top portion. In the preferred embodiment the tab 34 is triangular to facilitate easy attachment to the roof rail 14. The roof rail 14 includes a rectangular slot 36, generally perpendicular to the length of the roof rail 14 and sized to allow for easy insertion of the tab 34.

The air bag module 16 is attached to the hanger 18 with a threaded fastener 26 and a nut 28. The threaded fastener 26 and the nut 28 securely attach an inflator plate 29 to the bottom portion 22 of the hanger 18. It is worth noting that the air bag module 16 can similarly be attached to the side portion 24 of the hanger 18 if the design of the particular vehicle so dictates. A plurality of hangers like 18 may be attached to the air bag module, such as hangers 30 and 32 shown in FIG. 1.

Attachment of roof rail air bag assembly 10 to vehicle roof rail 14 is accomplished without fasteners, and this is seen in FIGS. 1 and 2. After being placed through the roof opening 12, the air bag module 16 is pulled toward the roof rail 14. The air bag module 16 slides into position under the roof rail 14, while the tab 34 drops into position in the slot 36. A roof panel 38 is later attached to roof rail 14, thereby permanently securing hanger 18 within the vehicle. The installed assembly is shown in FIG. 3.

In the case of larger vehicles, in particular sport utility vehicles, the air bag module may be longer and heavier, requiring substantial support. FIG. 4 shows a roof rail air bag assembly 40 that is suitable for use in larger vehicles. This embodiment provides a single hanger 42 that is long enough to include a plurality of tabs 44. Thus, the long top portion 46, helps to support the larger air bag module 48. Moreover, the bottom portion 50 of the hanger 42, is wide enough to provide multiple attachments 52 to the air bag module 48 along the length of the inflator plate 53.

A third embodiment of the invention is shown in FIG. 5. As in the previous embodiments, a roof rail air bag assembly 54, comprises a hanger 56 and an air bag module 58. Again, hanger 56 includes a top portion 60 and a bottom portion 62, connected by a side portion 64. A tab 66 is integral with the top portion 60, but in this embodiment the tab 66 is configured to fit into a slot 68 in the roof rail 70 that is parallel to the roof rail 70, rather than perpendicular to it as in the first two embodiments. The bottom portion 62 of the hanger 56 is attached to an inflator plate 71 of the air bag module 58 with a threaded fastener 72 and a nut 74. The air bag module 58 can be adapted to attach at the side portion 64 of the hanger 56, rather than at the bottom portion 62.

Figure 6:
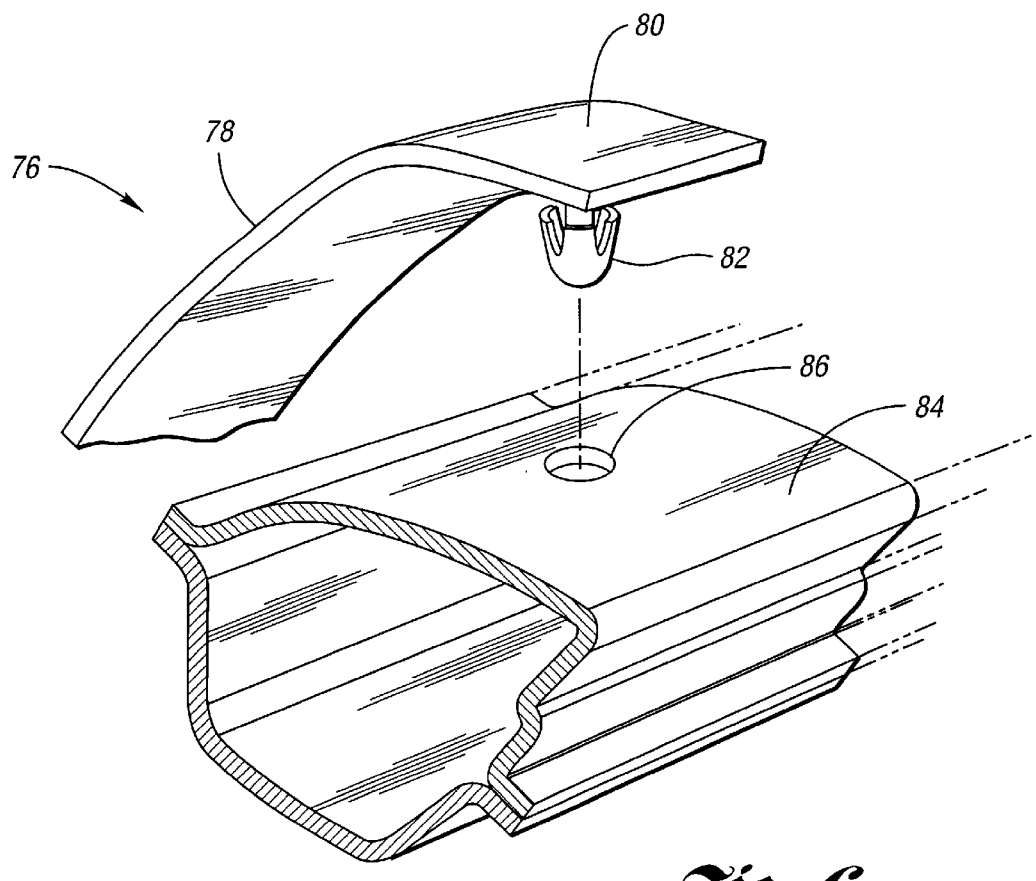
FIG. 6 is a fragmentary perspective expanded view of a vehicle roof rail and the hanger portion of a roof rail air bag assembly in accordance with a fourth embodiment of the invention.

Referring to FIG. 6, a portion of a roof rail air bag assembly 76 is shown in accordance with a fourth embodiment of the invention. In this embodiment, hanger 78 has a top portion 80, but the tab, characteristic of the preferred embodiment, is replaced by a push-in fastener 82. Roof rail 84 also differs from the preferred embodiment, in that it contains a hole 86 complimentary to the fastener 82, rather than a slot. Installation of this embodiment is very similar to that of the preferred embodiment. An operator standing outside the vehicle slides the air bag module (not shown) into place underneath roof rail 84, and then inserts the push-in fastener 82 into the hole 86 when the two are aligned.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A roof rail air bag assembly for a vehicle having a roof panel and a roof rail, comprising:
   an air bag module, having at least an air bag cushion;
   a hanger attached to the air bag module, having a top portion and a bottom portion connected to each other by a side portion, wherein each of the portions has an inner surface and an outer surface; and
   an attachment device located adjacent to the inner surface of the top portion of the hanger, and capable of cooperating with the roof rail and the roof panel for attaching the air bag assembly to the vehicle.

2. The roof rail air bag assembly of claim 1, wherein the attachment device is a tab, integral with, and approximately normal to, the top portion.

3. The roof rail air bag assembly of claim 1, wherein the attachment device is a push-in fastener.

4. The roof rail air bag assembly of claim 1, wherein the hanger is attached to the air bag module with a threaded fastener and a nut.

5. The roof rail air bag assembly of claim 1, wherein a plurality of hangers is used.

6. The roof rail air bag assembly of claim 2, wherein the hanger includes a plurality of tabs.

7. A method of installing a roof rail air bag module on a vehicle having a roof rail with an opening and a roof panel, without entering the vehicle or working overhead, comprising:
   providing the module with a hanger portion having an attachment device which is attachable to the roof rail from outside the vehicle; and
   trapping the hanger portion between the roof rail and the roof panel by attaching the roof panel to the roof rail from outside the vehicle.

8. The method of claim 7, wherein the attachment device is a tab, and further comprising inserting the tab into the roof rail opening prior to attaching the roof panel.

9. The method of claim 7, wherein the attachment device is a push-in fastener, and further comprising inserting the push-in fastener into the roof rail opening prior to attaching the roof panel.

10. The method of claim 7, wherein providing the air bag module with a hanger portion, comprises connecting the air bag module to the hanger portion with a threaded fastener and a nut.

11. A vehicle having a roof opening, comprising:
   a roof rail having a top portion and a bottom portion, and at least partially defining the roof opening, wherein the roof rail has an aperture in the top portion;
   a roof rail air bag assembly comprising at least a roof rail air bag module and at least one hanger, wherein the hanger has an attachment portion; and
   a roof panel configured to cover the roof opening, and securable to the roof rail, wherein the air bag module is located under the bottom portion of the roof rail, the hanger attachment portion is secured inside the roof rail aperture, and the roof panel is secured to the roof rail, thereby trapping the attachment portion of the hanger between the roof panel and the roof rail.

* * * * *